Jan. 13, 1948.  L. J. BERBERICH  2,434,540
CAPACITOR AND DIELECTRIC THEREFOR
Filed Dec. 4, 1941  2 Sheets-Sheet 1
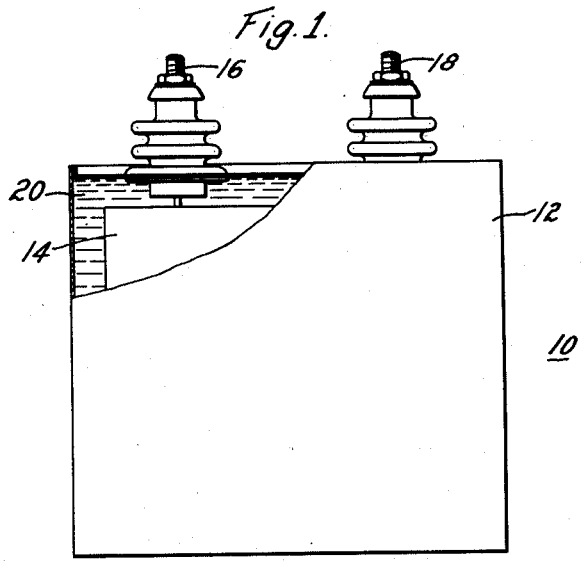
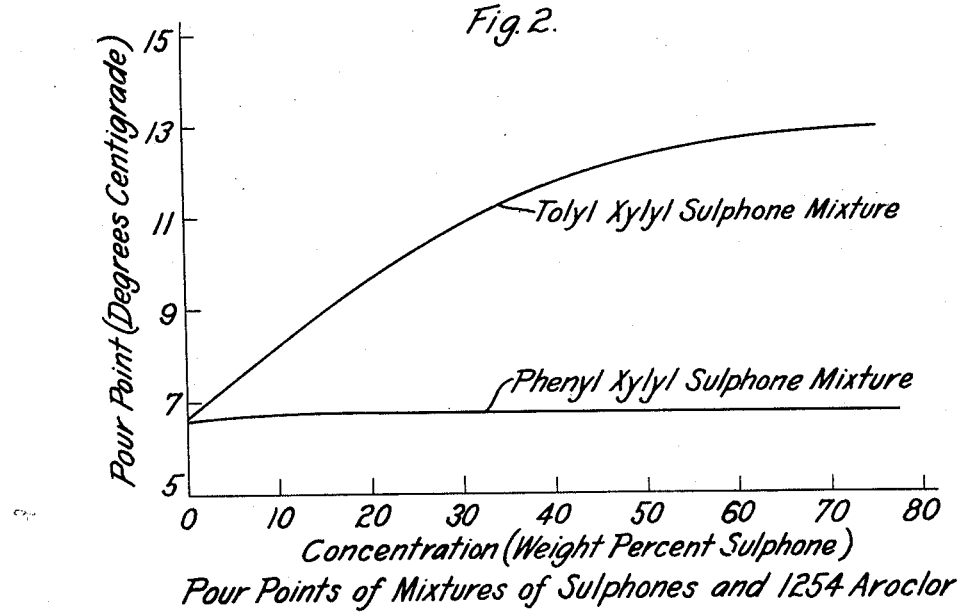
Pour Points of Mixtures of Sulphones and 1254 Aroclor
WITNESSES:  
Wm. B. Sellers.  
J. Shapoe
INVENTOR  
Leo J. Berberich.  
BY  
Ezra D. Savage  
ATTORNEY Jan. 13, 1948.    L. J. BERBERICH    2,434,540
CAPACITOR AND DIELECTRIC THEREFOR
Filed Dec. 4, 1941    2 Sheets-Sheet 2
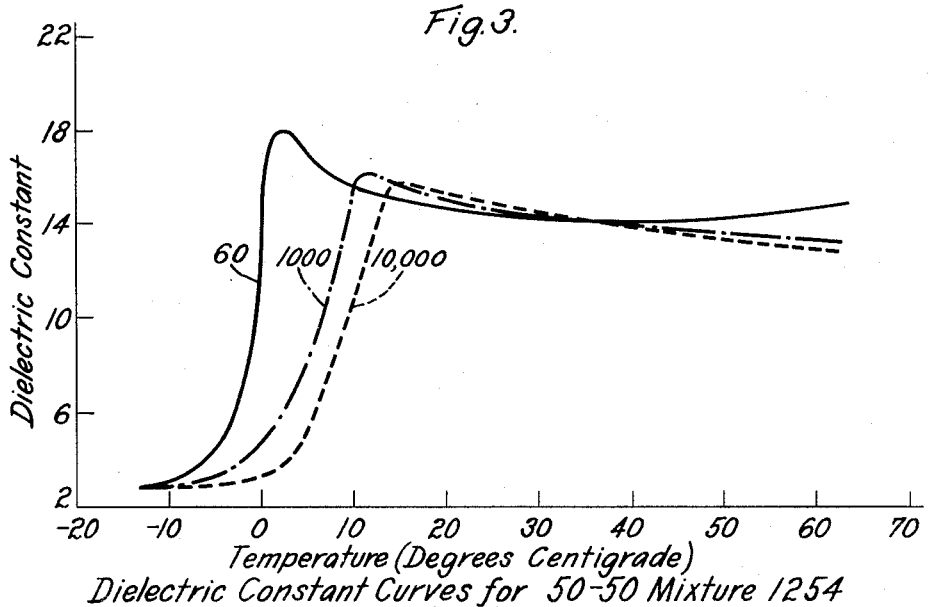
Dielectric Constant Curves for 50-50 Mixture 1254 Aroclor and Tolyl Xylyl Sulphone
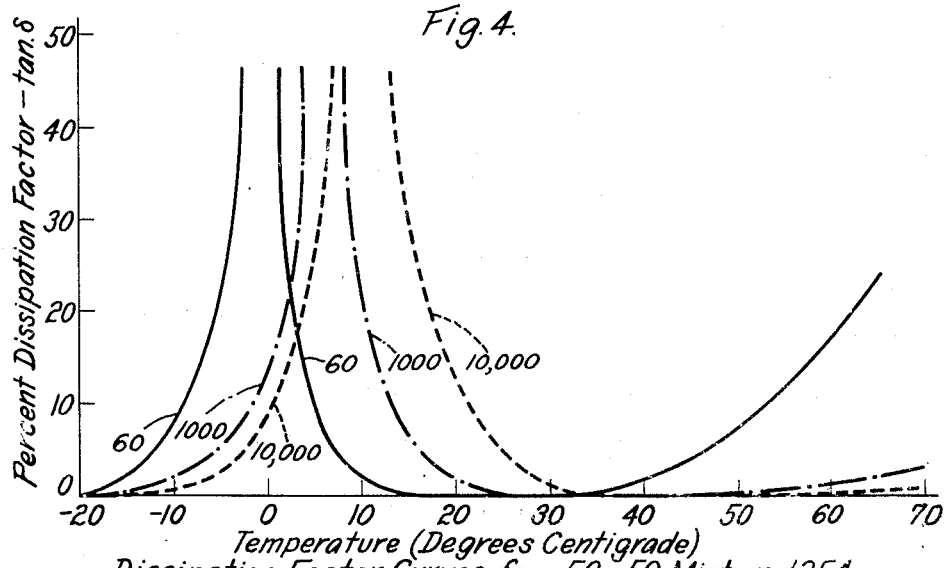
Dissipation Factor Curves for 50-50 Mixture 1254 Aroclor and Tolyl Xylyl Sulphone
INVENTOR
Leo J. Berberich.

Patented Jan. 13, 1948

2,434,540

UNITED STATES PATENT OFFICE 2,434,540

CAPACITOR AND DIELECTRIC THEREFOR

Leo J. Berberich, Forest Hills, Pa., assignor to Westinghouse Electric Corporation, East Pittsburgh, Pa., a corporation of Pennsylvania Application December 4, 1941, Serial No. 421,614

9 Claims. (Cl. 175—41)

1

This invention relates to electrical capacitors, and more particularly to fluid dielectric impregnated capacitors.

The object of this invention is to provide a dielectric which is liquid at atmospheric temperatures and which cooperates to give the capacitor a high dielectric constant.

Another object of the invention is to provide a capacitor with a liquid dielectric composed of a mixture of a sulfone and a halogenated diphenyl.

Other objects and advantages of the invention will, in part, be obvious and will, in part, appear hereinafter.

For a fuller understanding of the nature and objects of the invention, reference should be had to the following detailed description, taken in conjunction with the accompanying drawings, in which:

Figure 1 is a partly broken view in elevation of a capacitor;

Fig. 2 is a graph of a pour-point plotted against mixtures of sulfones and chlorinated diphenyls;

Fig. 3 is a graph of dielectric constant plotted against temperatures of a 50-50 mixture of sulfone and chlorinated diphenyl; and Fig. 4 is the dissipation factor plotted against temperature for a 50–50 mixture of sulfone and chlorinated diphenyl.

Chlorinated hydrocarbons of high dipolar moment have been previously employed as capacitor dielectrics due to their resistance to combustion and to the improvement in dielectric constant over ordinary insulating dielectrics, such as refined petroleum oil. Likewise, it is known to employ sulfones as capacitor dielectrics due to their high specific inductive capacity. However, the sulfones with high dielectric constants are generally solids and not liquid at normal temperatures at which capacitors are operated. Other characteristics of the sulfones, such as their tendency to support combustion when ignited, tend to operate against their application to commercial apparatus.

It has been discovered, according to this invention, that halogenated aryl compounds may be combined with diaryl sulfones to produce mixtures which are liquid at ordinary ambient temperatures while retaining a high dielectric constant. The mixtures are fire-resisting. In preparing the mixtures, it is necessary to combine sulfones and halogenated aryl compounds which are compatible and will not separate out when applied to electrical apparatus. Chlorinated diphenyl compounds have been found to be compatible with diphenyl sulfones and alkyl substituted diphenyl sulfones. The order of increasing compatibility with 50% to 60% chlorinated diphenyl is diphenyl sulfone, phenyl xylyl sulfone and tolyl xylyl sulfone. When combined in substantially equal weights, the components produce liquids which may be employed for impregnating capacitors with a high degree of satisfactory operation. The dielectric constant will be high. The sulfone may be combined with the chlorinated diphenyl by introducing pulverized sulfone to the heated chlorinated diphenyl liquid and stirring. A liquid mixture is produced. The mixtures should be low in acidity in order to reduce the power factor or dissipation factor to a minimum. One successful treatment consists in subjecting the liquid mixture to fuller's earth at a temperature of about 100° C. and filtering the mixture after the treatment. The acidity of the mixture is thereby reduced to less than 0.01 milligram of KOH per gram. Other treatments for reducing the acidity may be employed.

Referring to Fig. 1 of the drawings, 10 is a capacitor prepared in accordance with the invention. The capacitor 10 comprises a sealed metal casing 12 within which are located a plurality of separate metallic armatures or electrodes 14 commonly in the form of thin sheets of copper or other good conducting metal separated from one another by several thicknesses of extremely thin paper, such as 0.4 mil kraft paper. Customarily, three sheets of kraft paper of this thickness when combined have been found to produce the most desirable results, since the imperfections in the paper have an exceedingly small chance of coinciding when three sheets are superimposed. The metallic sheets which form the electrodes are tightly wound with the kraft paper interposed to prevent electrical contact. The wound electrodes are inserted within the casing 12 and connected to the terminal contact members 16 and 18, respectively. Generally the assembly is subjected to heat treatment under vacuum in order to remove all traces of moisture and other volatile substances. After treatment, while the vacuum still exists, dielectric fluid 20, which consists of the mixture of diaryl sulfone and chlorinated diphenyl, is introduced. The kraft paper readily absorbs the dielectric mixture and the apparatus is ready for use after the capacitor casing has been sealed off.

In preparing the mixtures of diaryl sulfones and chlorinated diphenyl substantially equal weight mixtures have been found to produce highly satisfactory results. Satisfactory sulfones for preparing mixtures have been the phenyl xylyl sulfone and the tolyl xylyl sulfone and they have produced advantageous compositions with diphenyl chlorinated to 50 to 60% of maximum chlorination. It has been noticed that the greater the number of sulfone isomers present, the more compatible the sulfones are with halogenated aryls. The increase in the number of side chains of the derivatives of diphenyl sulfones also appears to improve the compatibility.

Referring to Fig. 2 of the drawings, there is plotted the pour-point as determined by standard A. S. T. M. tests against concentration of the two sulfones in the chlorinated diphenyl. It will be noticed that the phenyl xylyl sulfone mixture has a substantially constant pour-point of approximately 7° C. The tolyl xylyl sulfone mixture exhibits a slight increase in the pour-point temperature to a maximum of about 13° C. at an 80% sulfone concentration. Therefore, for conditions where the temperatures to which the capacitor may be subjected approach the freezing point, the phenyl xylyl sulfone mixture would be preferred on this account. However, either mixture is liquid well within the range of temperatures to which apparatus of this type is normally subjected.

For the effect of temperature on the dielectric constant for equal weight mixtures of 54% chlorinated diphenyl and tolyl xylyl sulfone, reference should be made to Fig. 3. It will be noted that for 60-cycle capacitors, the dielectric constant is approximately 18 at a temperature slightly above the 0° C. For higher frequencies, the maximum dielectric constant occurs at temperatures slightly greater than this. Since the apparatus is intended to operate at temperatures above 0° C., as a rule the maximum dielectric constant will be available. One feature of the mixture is the substantially uniform dielectric constant with temperature in the operating range.

Reference should be made to Fig. 4, which shows the curves of percentage of dissipation factor plotted against temperature for equal weight mixtures of the same composition as in Fig. 3. The dissipation factor may be defined as the tangent of the angle by which the current and voltage depart from quadrature. It will be noted that the dissipation factor drops very sharply when the temperature is greater than 0° C. for 60-cycle current. At higher frequencies, the capacitor should be progressively warmer in order to secure a minimum dissipation factor. It will be appreciated that in normal operation, the high power factor at about 0° C. will produce heat which will warm the apparatus rapidly and the dissipation factor will drop rapidly as the temperature rises.

Since capacitors are normally stored in heated buildings which are kept at a temperature of about 28° C. and the customary frequency of alternating current to which apparatus is to be subjected is 60-cycle, the following table is given showing both the power factor and the dielectric constant for mixtures of tolyl xylyl sulfone and phenyl xylyl sulfone with 50% chlorinated diphenyl:

TABLE I

*Electrical properties of liquid mixtures at 60 cycles and 28° C.*

| Mixture No. | Power Factor, percent | Dielectric Constant |
| --- | --- | --- |
| I | 0.19 | 15.6 |
| II | 0.48 | 16.9 |

Mixture I is composed of equal parts of tolyl xylyl sulfone and 50% chlorinated diphenyl. Mixture II is composed of equal parts by weight of phenyl xylyl sulfone and 50% chlorinated diphenyl. This table gives the properties of the liquid mixtures without the presence of kraft paper or other absorbent.

Table II gives the electrical characteristics of mixtures I and II as well as 50% chlorinated diphenyl when employed in kraft paper capacitors.

TABLE II

*Electric properties of impregnated kraft capacitor paper at 60 cycles*

| Impregnant | Percent Power Factor | | Capacitance µF. | |
| --- | --- | --- | --- | --- |
| | 28° C. | 80° C. | 28° C. | 80° C. |
| Mixture No. I | 0.39 | 2.16 | 0.357 | 0.355 |
| Mixture No. II | 0.46 | 2.68 | 0.350 | 0.348 |
| 50% Chlorinated diphenyl | 0.30 | 0.60 | 0.250 | 0.240 |

The unimpregnated kraft paper capacitors employed in obtaining the results shown in Table II had a capacitance of 0.09 microfarad after thorough drying.

The effect of temperature on capacity is shown in Table III.

TABLE III

*Initial power factor-temperature data*

| Temperature, ° C. | Percent Power Factor | Cap., mmf. |
| --- | --- | --- |
| 25 | .30 | .357 |
| 35 | .47 | .356 |
| 50 | .92 | .354 |
| 80 | 2.16 | .355 |

It will be noted that the capacity is substantially constant through a wide range of temperatures, though the power factor does increase with temperature, as may be expected. In the case of low voltage capacitors, the increase in power factor is not critical while the improvement in capacity over the customary chlorinated diphenyl impregnant is approximately 40%. This 40% increase in capacity for a given size of apparatus constitutes a highly important advantage.

While the mixtures of sulfones and halogenated diphenyls have given good results, other halogenated aromatics may be employed to replace all or a part of the diphenyls. A particularly advantageous combination is the addition of freezing point depressants to chlorinated diphenyls. Trichlorbenzene, tetrachlorbenzene, tetrachlorethylbenzene and pentachlorethylbenzene are examples of freezing point depressants suitable for this purpose. Since the dielectric constant drops sharply at the pour point, freezing point depressants will lower the pour point and thereby increase the working temperature range of capacitors impregnated with the mixtures disclosed herein.

All of the halogenated diphenyl may be replaced by a lower freezing point halogenated aromatic compound in the sulfone mixtures to produce a mixture of utility below 0° C. For example, a mixture of:

| | Parts |
| --- | --- |
| Xylyl tolyl sulfone | 50 |
| Pentachlorethylbenzene | 25 |
| Tetrachlorethylbenzene | 25 | has a pour point of −25° C.

These lower freezing point additions may be added in less than the above quantities with beneficial results. Thus a mixture composed of:

| | Parts |
|---|---|
| Xylyl tolyl sulfone | 37½ |
| Phenyl xylyl sulfone | 37½ |
| Pentachlorethylbenzene | 12½ |
| Tetrachlorethylbenzene | 12½ | had a pour point of 0° C., but due to the greater proportion of sulfone than the preceding example exhibited an increased dielectric constant.

Since certain changes in carrying out the above process and certain modifications in the article which embody the invention may be made without departing from its scope, it is intended that all matter contained in the above description or shown in the accompanying drawings shall be interpreted as illustrative and not in a limiting sense.

I claim as my invention:

1. A capacitor comprising, in combination, electrodes, a sheet material separating and insulating the electrodes from one another, and a high specific inductive capacity liquid dielectric having a pour point of below 13° C. in the capacitor and cooperating with the sheet material, the dielectric comprising a mixture of diaryl sulfone selected from the group consisting of phenyl xylyl sulfone and tolyl xylyl sulfone and halogenated diphenyl.

2. A capacitor, comprising, in combination, a casing, electrodes in the casing and a high specific inductive capacity liquid dielectric having a pour point of below 13° C. in the casing cooperatively associated with the electrodes, the dielectric comprising a mixture of diaryl sulfone selected from the group consisting of phenyl xylyl sulfone and tolyl xylyl sulfone and a substantial proportion of halogenated diphenyl.

3. A capacitor, comprising, in combination, a casing, electrodes in the casing and a high specific inductive capacity liquid dielectric having a pour point of below 13° C. in the casing cooperatively associated with the electrodes, the dielectric comprising a mixture of diaryl sulfone selected from the group consisting of phenyl xylyl sulfone and tolyl xylyl sulfone and a substantial portion of halogenated diphenyl, and a freezing point depressant.

4. A dielectric having a high specific inductive capacity and a low pour-point of below 13° C., comprising, in combination, a mixture of diaryl sulfone selected from the group consisting of phenyl xylyl sulfone and tolyl xylyl sulfone and a substantial proportion of chlorinated diphenyl.

5. A dielectric having a high specific inductive capacity and a low pour-point of below 13° C., comprising, in combination, a mixture of diaryl sulfone selected from the group consisting of phenyl xylyl sulfone and tolyl xylyl sulfone and a substantial proportion of chlorinated diphenyl, and a freezing point depressant.

6. A dielectric having a high specific inductive capacity and a low pour-point of below 13° C., comprising, in combination, a mixture of diaryl sulfone selected from the group consisting of phenyl xylyl sulfone and tolyl xylyl sulfone and a substantially equal proportion of chlorinated diphenyl.

7. A dielectric having a high specific inductive capacity and a low pour-point of below 13° C., comprising, in combination, a mixture of diaryl sulfone selected from the group consisting of phenyl xylyl sulfone and tolyl xylyl sulfone and a substantial proportion of from 50% to 60% chlorinated diphenyl.

8. A dielectric having a high specific inductive capacity and being liquid at low ambient temperature of below 13° C., the dielectric comprising, in combination, a mixture of diaryl sulfone selected from the group consisting of phenyl xylyl sulfone and tolyl xylyl sulfone, chlorinated diphenyl, and a freezing point depressant.

9. A dielectric having a high specific inductive capacity and being liquid at low ambient temperature of below 13° C., the dielectric comprising, in combination, a mixture of diaryl sulfone selected from the group consisting of phenyl xylyl sulfone and tolyl xylyl sulfone and a low freezing point halogenated aromatic compound.

LEO J. BERBERICH.

REFERENCES CITED

The following references are of record in the file of this patent:

UNITED STATES PATENTS

| Number | Name | Date |
|---|---|---|
| 2,019,338 | Clark | Oct. 29, 1935 |
| 2,037,686 | Clark | Apr. 14, 1936 |
| 2,139,948 | Ford et al. | Dec. 13, 1938 |
| 2,211,019 | Lommel | Aug. 13, 1940 |
| 1,944,730 | Clark | Jan. 23, 1934 |
| 1,843,541 | Danziger | Feb. 2, 1932 |
| 1,836,180 | McCullough | Dec. 15, 1931 |